UNITED STATES PATENT OFFICE.

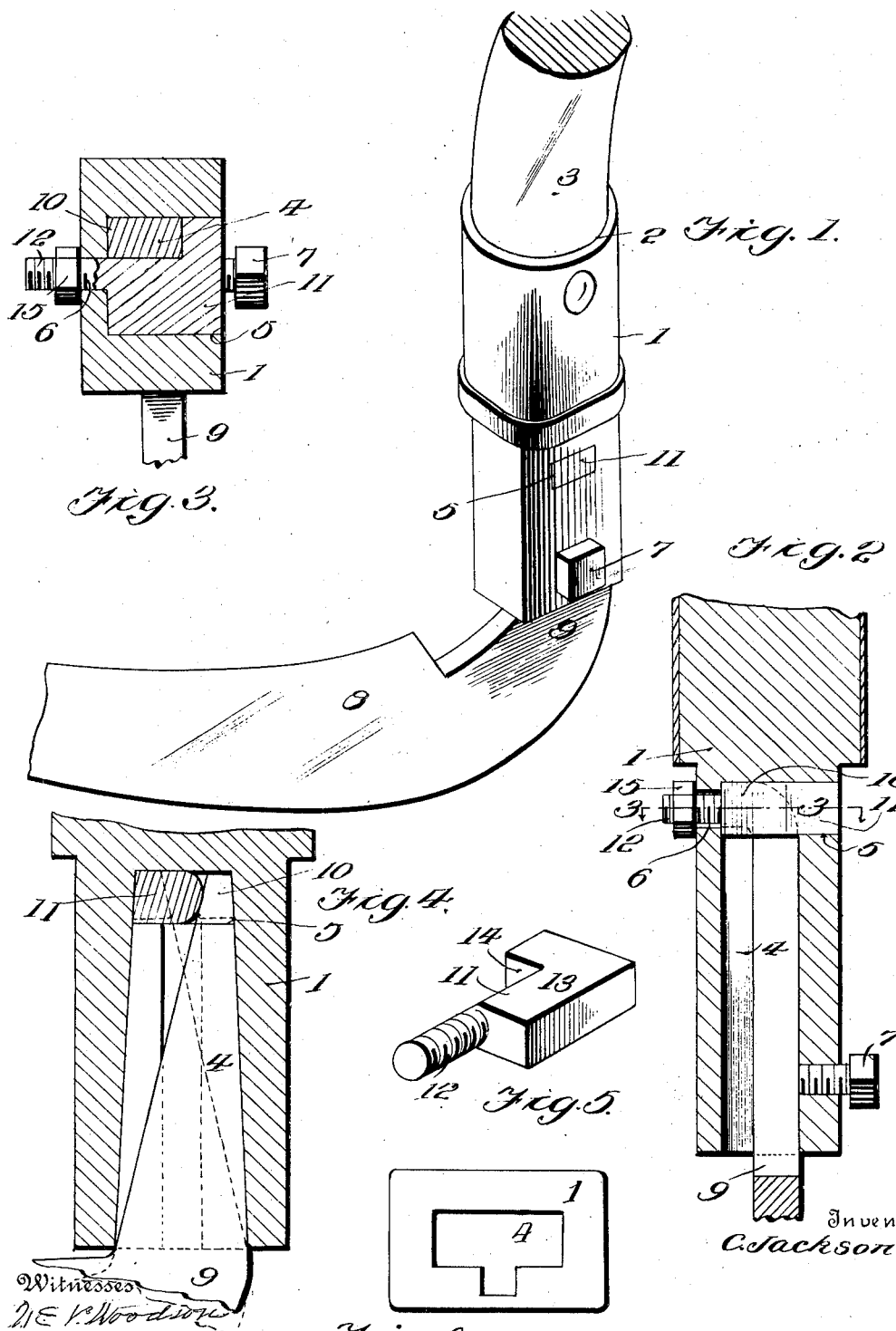

CHARLES JACKSON, OF HOLDER, ILLINOIS.

SCYTHE AND SNATHE COUPLING.

1,002,518.  Specification of Letters Patent.  Patented Sept. 5, 1911.

Application filed April 6, 1911. Serial No. 619,411.

*To all whom it may concern:*

Be it known that I, CHARLES JACKSON, a citizen of the United States, residing at Holder, in the county of McLean and State of Illinois, have invented certain new and useful Improvements in Scythe and Snathe Couplings, of which the following is a specification.

This invention relates to couplings for scythe blades and snathes, and its object is to provide a coupling adapted to be applied to any snathe of commercial form, which coupling is socketed and provided with securing devices for effectually and securely holding the blade in position, the said securing devices being reversible so that the scythe blade may be pitched at at least one of two angles to the general line of the snathe.

For a full understanding of the invention reference is to be had to the following description and accompanying drawings, in which:

Figure 1 is a perspective view of the coupling; Fig. 2 is a longitudinal sectional view of the same; Fig. 3 is a transverse sectional view of the same cut on the line 3—3 of Fig. 2; Fig. 4 is a longitudinal sectional view taken at a right angle to the view shown in Fig. 2; Fig. 5 is a perspective view of a wedge bolt used upon the coupling; Fig. 6 is an end view of the coupling showing the T-shaped slot therein.

Corresponding and like parts are referred to in the following description and indicated in all the views of the accompanying drawings by the same reference characters.

The coupling includes a member 1 which is provided at one end with a socket 2 adapted to receive the end of the snathe, indicated at 3. At its other end the said member 1 is provided with a T-shaped slot 4 which is disposed generally longitudinally of the snathe. The slot 4 extends from the lower end of the coupling to a point intermediate the ends thereof, and an opening extends from one side of the coupling into the interior thereof and communicates with the inner end of the said T-shaped slot. The said opening is elongated transversely of the coupling and is indicated at 5. At the opposite side of the coupling is provided an aperture 6 which extends from the side of the coupling to the bottom of the opening 5 and also communicates with the T-shaped slot 4. The aperture 6 is of circular bore.

A set screw 7 penetrates one side of the coupling and at its inner end is adapted to enter the T-shaped slot 4.

The scythe blade, indicated at 8, is provided with the usual shank 9 which has an end portion disposed at approximately right angles to the length of the blade and which, as is usual, is provided at its extremity with a laterally disposed lug 10. The shank 9 and lug 10 are adapted to be inserted in the T-shaped slot 4 of the member 1 during which movement the lug 10 passes along the stem of the slot 4 and the shank 9 is embedded in the apertures of the slot. When the lug 10 has arrived at the opening 5, the scythe blade 8 may be swung so that the said lug will be carried to one side or the other of the aperture 6. However, when this is done the lug will bear against the inner portion of one of the walls of the opening 5 and consequently the shank 9 is restrained against movement longitudinally with relation to the member 1.

A wedge bolt 11 is provided and the said bolt has a threaded portion 12 adapted to pass through the aperture 6 in the member 1, while the wedge or head portion of the said bolt is adapted to be received within the opening 5. The wedge portion 13 of the said bolt is cut away at one side, as at 14, in order to receive the lug 10 and extremity of the shank 9. Therefore it will be seen that when the shank 9 is inserted in the slot 4, the extremity of the said shank may be disposed to one side or the other of the aperture 6, which will position the scythe blade 8 at different angles with relation to the long dimension of the member 1, and therefore the said blade may be disposed at two different angles with relation to the snathe. When the blade has been positioned as desired, the wedge bolt 11 is inserted in the opening 5 and its threaded portion 12 projecting through the aperture 6. A nut 15 is then screwed upon the threaded portion 12 and thus the extremity of the shank 9 is secured. The set screw 7 is then tightened against the outer portion of the said shank 9 and the parts are securely held.

In practice now the scythe is seldom used except for rough work, as for instance, cleaning fence corners of weeds or briers and for opening initial swaths in fields, and consequently they are subjected to usage much rougher than they have been generally subjected to heretofore when they were used for mowing, or reaping purposes. Consequently the scythe as generally put out is unfitted to perform the services demanded of the same, and as a result the snathes fracture or wear out in the vicinity of the points in which the blade is connected with the same.

With the present invention the member 1 is a solid casting, preferably of malleable iron, and may be fitted to a new or partially worn snathe. Its configuration is such that it braces the entire scythe at the point which is subjected to the greatest strain, at the same time being composed of metal it adds weight at the swinging end of the snathe and at the shank end of the scythe blade, and consequently when the scythe is swung the operator is assisted in his work by the weight of the coupling, as herein shown and described.

Having thus described the invention, what I claim as new is:—

1. A coupling for a snathe and scythe blade, comprising a member provided at its end with a T-shaped slot adapted to receive the shank and lug of a scythe blade, said member having at the inner end of said slot an elongated opening disposed transversely of the member and extending from one side thereof to a point intermediate its opposite sides and at its opposite side portions the said member having an aperture which communicates with the said slot and the opening, a wedge bolt insertible in the opening and aperture, and a securing device for said bolt.

2. A coupling for a scythe blade and snathe, consisting of a member provided at its end with a longitudinally disposed T-shaped slot adapted to receive the shank and lug of a scythe blade, said member having in one side an elongated opening transversely disposed and provided at its opposite side with an aperture, the said opening and aperture communicating with each other and with the slot, a wedge bolt insertible in the opening and slot, a securing device for said bolt, said bolt at one side being cut away to receive the extremity of the scythe blade shank and lug, and a set screw passing through one side of the member and adapted to impinge against the intermediate portion of the scythe blade shank.

In testimony whereof I affix my signature in presence of two witnesses.

CHARLES JACKSON. [L. S.]

Witnesses:
,JESSE E. HOFFMAN,
ASA BIGHORN.